United States Patent [19]

Ito et al.

[11] 4,367,290

[45] Jan. 4, 1983

[54] METHOD FOR MANUFACTURE OF FOAMED ARTICLE

[75] Inventors: Katsukiyo Ito, Ichinomiya; Kazuo Kodaira, Nagoya, both of Japan

[73] Assignees: Agency of Industrial Science & Technology; Ministry of International Trade & Industry, both of Tokyo, Japan

[21] Appl. No.: 316,279

[22] Filed: Oct. 29, 1981

[30] Foreign Application Priority Data

Nov. 7, 1980 [JP] Japan ................................ 55-157406

[51] Int. Cl.$^3$ ............................................... C08J 9/02
[52] U.S. Cl. .................................... 521/77; 521/147; 521/148; 521/149
[58] Field of Search ................. 521/77, 147, 148, 149

[56] References Cited

U.S. PATENT DOCUMENTS

| | | | |
|---|---|---|---|
| 3,708,444 | 1/1973 | Gongler et al. | 521/149 |
| 3,760,047 | 9/1973 | Goeth et al. | 521/149 |
| 4,139,685 | 2/1979 | Schroeder | 521/149 |
| 4,187,353 | 2/1980 | Schroeder | 521/149 |
| 4,246,357 | 1/1981 | Hobes et al. | 521/149 |
| 4,314,035 | 2/1982 | Hobes et al. | 521/149 |

*Primary Examiner*—Morton Foelak
*Attorney, Agent, or Firm*—Oblon, Fisher, Spivak, McClelland & Maier

[57] ABSTRACT

A foamed article of poly-n-butyl methacrylate or a copolymer of n-butyl methacrylate and other vinyl monomer is obtained by allowing n-butyl methacrylate alone or n-butyl methacrylate in conjunction with the other vinyl monomer to stand at room temperature under a vacuum.

2 Claims, No Drawings

METHOD FOR MANUFACTURE OF FOAMED ARTICLE

BACKGROUND OF THE INVENTION

This invention relates to a method for the manufacture of a foamed article of poly-n-butyl methacrylate or a foamed article of a copolymer of n-butyl methacrylate and other vinyl monomer, which foamed article is free from the possibility of causing environmental pollution.

To date, foamed articles of numerous high molecular compounds have been developed and have found acceptance for use in heat insulation materials, packaging materials, and noise-abating materials. These conventional foamed articles have had various disadvantages such as highly complicated methods which are inevitably required for their production and very serious problems of environmental pollution caused by the noxious gases they generate during combustion. For example, a foamed polystyrene article is manufactured by blending a polystyrene resin and an expanding agent and heating the resultant blend at a temperature higher than the decomposition temperature of the expanding agent. Thus, the manufacture of this article requires steps for the blending of the expanding agent and the application of heat to the resultant blend, making the procedure of manufacture highly complicated and consequently elevating the cost of production. In the case of a foamed polyurethane article, although it can be produced in the neighborhood of room temperature without requiring incorporation of any expanding agent, it has a problem that the foamed article emits a noxious gas during its combustion.

Japanese Unexamined Patent Publication No. 67358/1973 discloses a method for producing a foamed article of a high molecular organic compound having fine cells uniformly distributed therein by polymerizing a vinyl-polymeric unsaturated carboxylate. In the disclosure, butyl methacrylate is cited as one example of vinyl-polymeric unsaturated carboxylates. This method is characterized by heating the carboxylate in the presence of a halogenide of a metallic element from the 4th and 5th periods in the Periodic Table of Elements and particularly by effecting this heating at a temperature higher than the melting point of the high molecular organic compound.

The object of this invention is to provide a method for the manufacture of a foamed article of poly-n-butyl methacrylate or a foamed article of a copolymer of not less than 95% of n-butyl methacrylate and not more than 5 percent of other vinyl monomer (such as styrene, methyl methacrylate, divinyl adipate, for example) by an easy method which requires neither addition of any expanding agent nor application of heat).

SUMMARY OF THE INVENTION

With a view to attaining the object described above, the inventors made a diligent study in search for a method for producing a foamed article which is obtained without use of any expanding agent and which emits no noxious gas during its combustion. They have consequently found that in the absence of a polymerization inhibitor, n-butyl methacrylate polymerizes with foaming at room temperature under a vacuum. The present invention has issued from this discovery.

Specifically, this invention provides a method for the manufacture of a novel foamed article of poly-n-butyl methacrylate or a copolymer of n-butyl methacrylate and other vinyl monomer, which method is characterized by polymerizing n-butyl methacrylate alone or not less than 95% of n-butyl methacrylate and not more than 5% by other vinyl monomer (such as styrene, methyl methacrylate, divinyl adipate, for example) in the absence of a polymerization inhibitor at room temperature under a vacuum.

DESCRIPTION OF THE PREFERRED EMBODIMENT

The method of this invention is characterized by polymerizing pure or virtually pure n-butyl methacrylate or copolymerizing not less than 95% of such pure n-butyl methacrylate and not more than 5% of other vinyl monomer (such as styrene, methyl methacrylate, divinyl adipate, for example). When commercially available n-butyl methacrylate inevitably containing a polymerization inhibitor is to be used for this invention, it can be made usable in this method by treating the monomer with an aqueous alkali solution such as an aqueous caustic soda solution thereby effecting thorough removal of the polymerization inhibitor and further refining the monomer by distillation.

When n-butyl methacrylate or not less than 95% of n-butyl methacrylate and not more than 5% of other vinyl monomer (such as styrene, methyl methacrylate, divinyl adipate, for example) are allowed to stand at room temperature under a vacuum, the polymerization or copolymerization proceeds. This polymerization to proceed smoothly at temperatures in the range of from 10° to 35° C. and under a vacuum of not more than 1 mmHg. Practically, however, the vacuum is selected in the range of from 1 mmHg to $10^{-4}$ mmHg.

The polymerization may be expedited by addition of a radical polymerization initiator to the polymerization system. The amount of the radical polymerization initiator is at most 2% by weight based on the weight of n-butyl methacrylate or the combined weight of n-butyl methacrylate and other vinyl monomer. Concrete examples of the radical polymerization inhibitor usable advantageously in this case include 2,2'-azobisisobutylonitrile and benzoyl peroxide.

The foamed article produced by the method of this invention comprises not less than 95% of poly-n-butyl methacrylate and does not dissolve in ordinary solvents such as acetone and tetrahydrofuran. Thus, it is believed to have a reticular texture. The foaming ratio of the produced foamed article is variable proportionally with the degree of vacuum, which in turn is variable from 1 to $10^{-4}$ mmHg as described above.

The cells formed in the foamed article range from 0.005 mm to 0.05 mm in diameter, averaging about 0.02 mm. In appearance, the foamed article is a white rigid foam with a fine texture. The progress of the polymerization can easily be evaluated by the extent to which the foamed portion (in which the polymerization has been substantially completed) has spread. The foamed article can be produced in suitable dimensions, depending on the particular use to which the product is put.

Since the foamed articles obtained by the method of this invention emit and absolutely no noxious gas during their combustion, they can be utilized extensively as building materials and interior decoration materials. Further by the method of this invention, the foamed polymers can be obtained by a single step from the monomers without requiring any foaming agent. Thus, this method is an economical, energy-saving method suitable for commerical operation.

Now, the present invention will be described more specifically below with reference to working examples.

EXAMPLE 1

Commercially available n-butyl methacrylate was freed from a polymerization inhibitor contained therein by a treatment with a caustic soda solution. Under a pressure of 29 mmHg, 500 g of the resultant n-butyl methacrylate and 0.1 g of 2,2'-azobisisobutylonitrile added thereto were distilled twice to obtain pure n-butyl methacrylate as a fraction boiling at 71° C.

In a glass ampoule, 10 g of the purified n-butyl methacrylate was sealed in under a vacuum of about $10^{-2}$ mmHg. When this ampoule was allowed to stand at 30° C. for 24 hours, its content was polymerized to about 10 percent. At this point, the content began to foam and the speed of polymerization began to rise notably. After 48 hours of standing, the polymerization reached nearly 100%. Thus, the foaming and the polymerization were completed.

At the end of the reaction, the volume of the content increased to about twice the volume before the reaction. The density of the foamed product was 0.50 and the size of the individual cells in the foamed product was about 0.02 mm in diameter. The foamed product emitted no noxious gas in a combustion test. The foamed article was completely insoluble in acetone, benzene, tetrahydrofuran, etc. Thus, it is believed to possess a reticular texture.

EXAMPLE 2

An ampoule was charged with 9.8 g of the purified n-butyl methacrylate obtained in Example 1, 0.2 g of what was obtained by removing a polymerization inhibitor from commercially available divinyl adipate and subsequently drying the refined adipate, and 1.6 mg of 2,2'-azobisisobutylonitrile. The ampoule was then vacuumized to about $10^{-3}$ mmHg and sealed. When the ampoule was allowed to stand at 30° C. for about 48 hours, its content began to foam. After 72 hours of the standing, the foaming and the polymerization of the content was completed.

At the end of the reaction, the volume of the content was 1.8 times the volume before the reaction. The foamed article had a density of 0.6 and the size of the individual cells formed in the foamed article was about 0.01 mm in diameter.

What is claimed is:

1. A method for the manufacture of a novel foamed article, characterized by allowing 95 to 100% of n-butyl methacrylate and 0 to 5% of other vinyl monomer to stand at a room temperature in the range of from 10° to 35° C. under a vacuum in the range of from 1 mmHg. to $10^{-4}$ mmHg. thereby effecting polymerization of said monomers.

2. The method according to claim 1, wherein the vinyl monomer is at least one member selected from the group consisting of styrene, methyl methacrylate, and divinyl adipate.

* * * * *